United States Patent
Ren et al.

(10) Patent No.: US 8,216,471 B2
(45) Date of Patent: Jul. 10, 2012

(54) INTEGRATED BIOREACTOR AND METHOD OF USING THE SAME FOR TREATMENT OF HIGHLY CONCENTRATED ORGANIC WASTEWATER

(75) Inventors: Hongqiang Ren, Nanjing (CN); Ke Xu, Nanjing (CN); Lili Ding, Nanjing (CN); Jicheng Xie, Nanjing (CN); Xinkun Ren, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 13/246,885

(22) Filed: Sep. 28, 2011

(65) Prior Publication Data

US 2012/0138527 A1 Jun. 7, 2012

Related U.S. Application Data

(63) Continuation of application No. PCT/CN2010/079454, filed on Dec. 6, 2010.

(51) Int. Cl.
*C02F 3/30* (2006.01)
(52) U.S. Cl. ........ 210/603; 210/605; 210/615; 210/623; 210/260
(58) Field of Classification Search .................. 210/603, 210/605, 614, 615, 616, 617, 623, 630, 260
See application file for complete search history.

(56) References Cited

U.S. PATENT DOCUMENTS

| | | | | |
|---|---|---|---|---|
| 4,954,257 A * | 9/1990 | Vogelpohl et al. | ............ | 210/607 |
| 5,211,848 A * | 5/1993 | Friday et al. | .................. | 210/611 |
| 5,441,634 A * | 8/1995 | Edwards | ...................... | 210/194 |
| 5,733,454 A * | 3/1998 | Cummings | .................... | 210/603 |
| 6,086,765 A * | 7/2000 | Edwards | .................... | 210/605 |
| 6,730,223 B1 * | 5/2004 | Anderson et al. | ............ | 210/603 |
| 7,008,538 B2 * | 3/2006 | Kasparian et al. | ............ | 210/610 |
| 7,485,228 B2 * | 2/2009 | Herding et al. | ............... | 210/603 |
| 2008/0283468 A1 * | 11/2008 | Logan et al. | .................. | 210/603 |

FOREIGN PATENT DOCUMENTS

CN 201883000 U * 6/2011

* cited by examiner

*Primary Examiner* — Fred Prince
(74) *Attorney, Agent, or Firm* — Matthias Scholl P.C.; Matthias Scholl

(57) ABSTRACT

An integrated bioreactor and its applications as well as a method for treatment of highly-concentrated organic wastewater using the same. The integrated bioreactor with a concentric columnar structure includes an inner layer and an outer layer, in which the inner layer is an upflow anaerobic sludge blanket (UASB) and the outer layer is a moving bed biofilm reactor (MBBR). The effluent of the MBBR is recycled into UASB via a reflux pump mounted between a water tank and the integrated bioreactor. A water outlet of the UASB is arranged with an on-line pH monitor and a mechanical agitation device is arranged on the top of a bottom water distributor. The bioreactor is low in cost, features friendly maintenance, stable operation, and high degree of automation, and can be applied under low temperature.

11 Claims, 1 Drawing Sheet

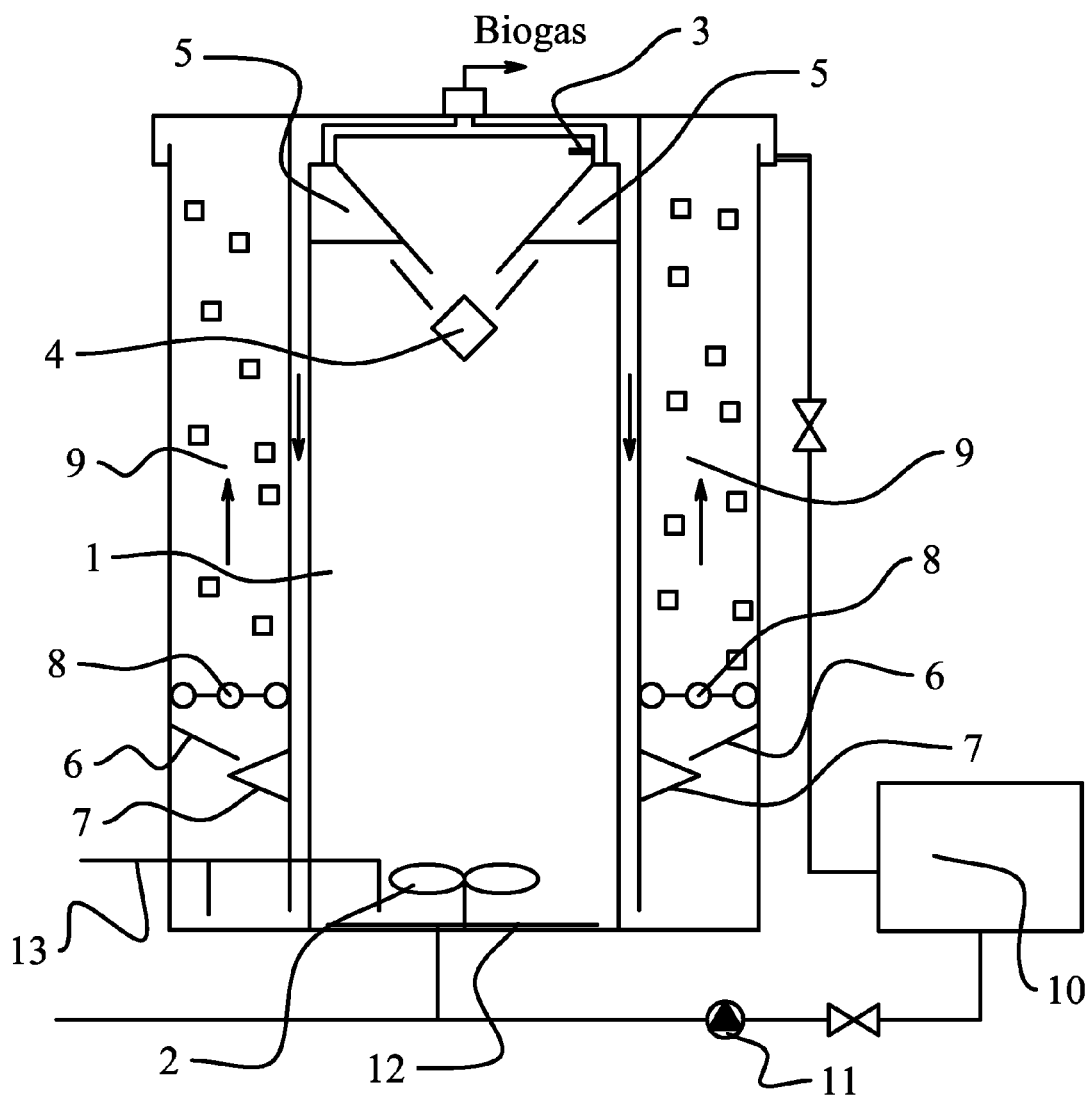

INTEGRATED BIOREACTOR AND METHOD OF USING THE SAME FOR TREATMENT OF HIGHLY CONCENTRATED ORGANIC WASTEWATER

CROSS-REFERENCE TO RELATED APPLICATIONS

This application is a continuation of International Patent Application No. PCT/CN2010/079454 with an international filing date of Dec. 6, 2010, designating the United States, now pending. The contents of all of the aforementioned applications, including any intervening amendments thereto, are incorporated herein by reference.

CORRESPONDENCE ADDRESS

Inquiries from the public to applicants or assignees concerning this document should be directed to: MATTHIAS SCHOLL P.C., ATTN.: DR. MATTHIAS SCHOLL, ESQ., 14781 MEMORIAL DRIVE, SUITE 1319, HOUSTON, TX 77079.

BACKGROUND OF THE INVENTION

1. Field of the Invention

The invention relates to a wastewater treatment device and its applications as well as a wastewater treatment method using the same, and more particularly to an integrated bioreactor and its applications as well as a method for treatment of highly-concentrated organic wastewater using the same.

2. Description of the Related Art

Upflow anaerobic sludge blanket technology, normally referred to as UASB, has been widely used in treatment of industrial wastewater recently. UASB mainly operates under intermediate temperature (30-35° C.) and high temperature (50-55° C.), resulting in ideal effluent quality because of excellent microbiological activity inside the reactor. However, when temperature is low, the microbiological activity in a UASB will be restrained. Once organic loading is higher, acid-base equilibrium inside the UASB reactor is likely to be acidified, leading to higher chemical oxygen demand (COD) concentration, acidic effluent pH level, and upward-flow of sludge, consequently the effluent quality will be severely deteriorated.

To ensure stable operation of UASB under low temperature and maintain acid-base equilibrium inside the UASB reactor and avoid acidification, different measures can be adopted such as heating up wastewater, adding alkalinity, effluent recycle, recycle after $CO_2$ stripping, or adding low-temperature bacterial strain. Nevertheless, in actual technical applications, all those measures have disadvantages and limits, e.g. high economic cost, large energy consumption, too many dissolved oxygen in effluent, and absence of application examples.

Integrated bioreactors combine a variety of biological treatment processes within a single bioreactor to deal with wastewater, having the advantages of low investment, low land occupation, low energy consumption, excellent treatment results, and convenient management. Until now, there have been a large number of studies and applications on integrated bioreactors used in treatment of domestic sewage and industrial wastewater by systematically integrating anaerobic, anoxic, and aerobic processes within a superimposed or a sleeve type reactor. However, those integrated reactors are only used under normal temperature. There is no R&D on integrated bioreactors used in treatment of highly-concentrated organic wastewater under low temperature conditions.

Moving bed biofilm reactor (MBBR) is a new and efficient aerobic wastewater treatment process based on conventional activated sludge process and biological contact oxidation process. MBBR process, using suspended carriers with specific gravity close to water as microbial carriers, enables microorganism to fully contact with dissolved oxygen and organic substances within the water by means of powerful lifting effect of aeration and water current. Such process is in favor of transferring matrices to achieve excellent removal effect on organic substances. Compared with other aerobic wastewater treatment processes, MBBR process has the advantages of lower land occupation, stronger load impact, higher sludge concentration, fewer surpluses sludge volume, less head loss, and excellent nitrogen and phosphorus removal effects. It also does not need backwash or recycling. In addition, many studies have shown that since sludge concentration is high and biosolids have long retention time under MBBR process, it can still achieve an ideal effect even under low temperature conditions.

SUMMARY OF THE INVENTION

In view of the above-described problems, it is one objective of the invention to provide an integrated bioreactor for treatment of highly-concentrated organic wastewater that can avoid acidification and treat industrial wastewater under normal temperature.

It is another objective of the invention to provide a method for treatment of highly-concentrated organic wastewater that can avoid acidification and treat industrial wastewater under normal temperature.

UASB and MBBR technologies are integrated together within the integrated bioreactor in accordance with the invention. It uses effluent recycle of MBBR to supplement alkalinity to UASB. The UASB is mounted with a hydraulic agitation device inside to increase mass transfer rate and heat preservation ability of MBBR to UASB. Acid-base equilibrium can be achieved within the bioreactor without adding extra alkalinity or by adding only a small amount of alkalinity, so that microbial stability is ensured and acidification phenomena is eliminated when highly-concentrated organic wastewater is treated by anaerobic organisms under low temperature conditions.

To achieve the above objectives, in accordance with one embodiment of the invention, there is provided an integrated bioreactor having a concentric columnar structure and comprising an inner layer and an outer layer, wherein the inner layer is UASB and the outer layer is MBBR, and effluent of the MBBR is recycled into the UASB.

The capacity and hydraulic retention time of the UASB and the MBBR are determined upon wastewater quality. The ratio of width to height of a MBBR's reaction zone is 0.25-0.5. The MBBR width refers to the difference between a diameter of the integrated bioreactor and that of the UASB. An on-line pH monitor is arranged at a water outlet of the UASB. A mechanical agitation device is arranged above a bottom water distributor of the UASB. An inclined plate and a half-rhombic baffle are respectively arranged at 1-2 m position from the bioreactor bottom within the MBBR's reaction zone. An air distributor of the MBBR is either a perforated pipe or an aerator forming a concentric circle, which is mounted above the inclined plate and the half-rhombic baffle.

In accordance with another embodiment of the invention, there is provided a method for treatment of organic wastewater comprising applying the integrated bioreactor to highly-concentrated organic wastewater.

In another aspect, the invention further provides a method using the integrated bioreactor for treatment of highly-concentrated organic wastewater, the method comprising the steps of:

(1) introducing wastewater into a bottom water distributor of the UASB comprising a mechanical agitation device arranged above the bottom water distributor, agitating the wastewater to make organic substances of the wastewater fully contact with anaerobic granular sludge so that anaerobes degrade macromolecular organic substances into micromolecular organic substances, biogas, carbon dioxide, and water in the process of hydrolization, acidification, and production of methane, separating biogas, anaerobic sludge, and water using a three-phase separator to make the biogas enter a gas collection tank, the sludge deposit into the UASB's reaction zone, and the wastewater flow upward to the top of the bioreactor and thereafter flow under gravity to the bottom of the bioreactor and enter the outer layer MBBR;

(2) carrying out second-time sludge-water separation by the inclined plate and the half-rhombic baffle arranged in the MBBR's reaction zone, which is equivalent to the secondary sedimentation tank of UASB in conventional treatment;

(3) flowing upward the wastewater to the MBBR's aeration device where the wastewater is furiously mixed with gas, the gas, wastewater, and fluidized carriers are fully contacted, and the organic substances within the wastewater is aerobically degraded by microorganism on the surface of the carriers into carbon dioxide and water; collecting effluent from an effluent weir arranged on the top of the MBBR into a water tank;

(4) pumping the effluent to the entrance of the bioreactor using a reflux pump arranged between the water tank and the integrated bioreactor.

In a class of this embodiment, the mechanical agitation device, mounted at the bottom of the UASB, is in a shutoff state under normal conditions and operates when UASB's water outlet pH <6.8.

In a class of this embodiment, the specific gravity of the suspended carriers to be added is 0.93-0.99, feeding rate is 40%-60%, and aeration rate shall ensure that the dissolved oxygen volume is at 2-4 mg/L. In accordance with the invention, the above figures are not strictly limited and it shall be deemed that both the feeding rate and the aeration rate will meet the requirements within that range.

In a class of this embodiment, the reflux ratio of the MBBR to the UASB is 100-300%. When the pH of the UASB's water outlet is 6.8-7.5, the reflux ratio will be 100% and when the pH <6.8, the reflux ratio shall be increased.

One of important conditions to keep UASB operating stably is to control the pH within 6.5-7.8. Under normal conditions, the integrated bioreactor is able to maintain acid-base equilibrium by the bicarbonate/carbonic acid buffer system of its own. Although aerobic organism will also produce $CO_2$ and form the carbonic acid, it is unnecessary to add extra alkalinity and often effluent alkalinity is higher than influent alkalinity because aerobic aeration is liable to strip highly-concentrated $CO_2$ and some organic substances will also produce alkalinity during degradation. When temperature is low, microbiological activity in the UASB reactor will be restrained, and organic substances and volatile fatty acid (VFA) will not be completely degraded; when VFA concentration is higher than bicarbonate alkalinity, failing to be neutralized, the acid-base equilibrium will be broken, thus leading to lower effluent pH and higher COD concentration. In this point, anaerobic effluent recycle is unable to supplement alkalinity any longer. However, large amount of organic composition (e.g. protein), organic acid salt, or fatty acid salt in anaerobic effluent, undegraded but able to release cation, can produce extremely high alkalinity after aerobic degradation. Furthermore, after VFA is degraded and $CO_2$ is stripped during aerobic aeration, the alkalinity will be greatly increased. Therefore, aerobic effluent recycle is able to supplement alkalinity to UASB, the acid-base equilibrium in the anaerobic zone can be restored without adding extra alkalinity or by only adding a small amount of alkalinity. The key to apply the above theory into practice is follow-up aerobic treatment process of UASB, which can operate stably under low temperature, withstand load impact and preferably degrade organic substances when UASB is in acidification. In consideration of the above descriptions, MBBR is selected in the invention as the follow-up aerobic treatment process of UASB. MBBR is a new and efficient aerobic wastewater treatment process, which has the advantages of higher sludge concentration, fewer surpluses sludge volume, stronger load impact, stable operation under low temperature, less head loss, and excellent nitrogen and phosphorus removal effects. It also does not need backwash or recycling. When UASB is in acidification, it can well adapt to load impact, degrade organic substances, and provide alkalinity for UASB.

To save land occupation, reduce investment and improve treatment efficiency, UASB and MBBR are combined into an integrated reactor in the invention with a concentric columnar structure comprising an inner layer UASB and an outer layer MBBR. MBBR is an aerobic organism reactor, where microorganisms conduct oxidation and decomposition on organic substances in the process of aerobic reaction to produce $CO_2$, $H_2O$ and release energy. As a result, MBBR is able to preserve heat for the inner layer UASB because it can maintain higher temperature and water has poor heat conductivity.

The on-line pH monitor, arranged at the UASB's water outlet, is used to adjust effluent reflux ratio of MBBR according to effluent pH value. Under normal conditions, the effluent reflux ratio of MBBR is 100%, which can provide sufficient alkalinity for UASB. When pH <6.8, it indicates that UASB may have acidification phenomenon, reflux ratio of MBBR shall be increased to supplement more alkalinity. At the same time, increasing effluent reflux ratio of MBBR may also dilute influent, decrease organic load, and restore acid-base equilibrium of UASB.

When water temperature is low, the viscosity of water within the bioreactor will become higher and mass transfer rate will become slower so that organic substances are difficult to be degraded and acidification are likely to occur. Consequently, the mechanical agitation device is arranged at the bottom of the UASB. When the UASB's water outlet pH <6.8, it will operate to increase hydraulic agitation and enhance matrix transfer. But under normal conditions, it needs not to be agitated so as to save energy consumption.

The inclined plate and the half-rhombic baffle, arranged at 1-2 m position from the bioreactor bottom within the MBBR's reaction zone, can replace secondary sedimentation tank to carry out second-time sludge-water separation with respect to effluent sludge coming from UASB and meanwhile prevent sludge loss caused by upward-flow of large amount of sludge when UASB is in acidification.

Advantages of the invention are summarized below. The invention provides an integrated bioreactor and its applications as well as highly-concentrated organic wastewater treatment method. Acid-base equilibrium can be achieved within the bioreactor without adding extra alkalinity or by only adding a small amount of alkalinity so that microbial stability is ensured and acidification phenomena is eliminated when highly-concentrated organic wastewater is treated by anaerobic organisms under low temperature conditions. It has the advantages of low investment, low costs, friendly maintenance, stable operation, and high degree of automation. The invention can also be used for technical innovation or upgrade of already established UASB reactors with reduced workload and low cost.

BRIEF DESCRIPTION OF THE DRAWINGS

The invention is described hereinbelow with reference to accompanying drawings, in which the sole FIGURE is a schematic diagram of an integrated bioreactor according to one embodiment of the invention. In the drawings, the following reference numbers are used: UASB reaction zone 1, agitation device 2, on-line pH monitor 3, three-phase separator 4, gas tank 5, inclined plate 6, half-rhombic baffle 7, aeration device 8, MBBR reaction zone 9, water tank 10, reflux pump 11, water distributor 12, and sludge return pipe 13.

DETAILED DESCRIPTION OF THE EMBODIMENTS

An integrated bioreactor with a concentric columnar structure comprises an inner layer and an outer layer, in which the inner layer is UASB and the outer layer is MBBR. The effluent of the MBBR is recycled into UASB. The capacity and hydraulic retention time of the UASB and MBBR are determined upon wastewater quality. The ratio of width to height of a MBBR's reaction zone shall be 0.25-0.5 and the MBBR width refers to the difference between a diameter of the integrated bioreactor and that of the UASB. A water outlet of the UASB is arranged with an on-line pH monitor and a mechanical agitation device is arranged on the top of a bottom water distributor. An inclined plate and a half-rhombic baffle are respectively arranged at 1-2 m position from the bioreactor bottom within the MBBR's reaction zone. An air distributor of the MBBR is either a perforated pipe or an aerator forming a concentric circle, which is mounted above the inclined plate and the half-rhombic baffle.

Wastewater is first introduced into the UASB reaction zone 1 from the UASB's bottom water distributor 12, whose upside is arranged with the mechanical agitation device 2, enabling organic substances of the wastewater to fully contact with anaerobic granular sludge through agitation. The mixture will then flow out from the top after anaerobic biodegradation and biogas produced in anaerobic reaction zone will enter into the gas tank 5 through the three-phase separator 4. After the effluent flows under gravity to the bottom of the bioreactor and enters into the outer layer MBBR reactor, it will be separated for the second time by the inclined plate 6 and the half-rhombic baffle 7, and then furiously mixed with gas through the aeration device 8 of MBBR. Afterwards, it will fully contact with the fluidized carriers in the MBBR reaction zone 9 and organic substances in the water will be aerobically degraded by microorganism on the surface of the carriers. An effluent weir is arranged on the top of the MBBR, through which the effluent enters into a water tank 10. A reflux pump 11 is mounted between the water tank and the integrated bioreactor, and the effluent will recycle into the UASB. The mechanical agitation device, mounted at the bottom of the UASB, is in a shutoff state under normal conditions and operates when UASB's water outlet pH <6.8. The proportion of suspended carriers to be added is 0.93-0.99, feeding rate is 40-60% and aeration rate shall ensure that the dissolved oxygen volume is at 2-4 mg/L. The reflux ratio of the MBBR to the UASB is 100-300%. When the pH of the UASB's water outlet is 6.8-7.5, the reflux ratio will be 100% and when the pH <6.8, the reflux ratio shall be increased.

Example 1

The aforementioned devices and treatment process are used for treatment of highly-concentrated organic wastewater in winter (5-15° C.). The quality index of the wastewater are listed in Table 1:

TABLE 1

| Highly-concentrated Organic Wastewater Quality Index | | | | |
|---|---|---|---|---|
| Wastewater quality index | COD (mg/L) | BOD (mg/L) | pH | Alkalinity |
| Variation range | 3500-4500 | 2900-3600 | 6.5-8.5 | 400-750 |

The hydraulic retention times of the UASB and the MBBR are 18 h and 6 h, respectively. The specific gravity of suspended carriers added in the MBBR is 0.96. The feeding rate is 60% and dissolved oxygen is 4 mg/L. Strictly monitor the effluent pH level of the UASB reactor during the operation and adjust reflux ratio in time. When pH value reaches to the lowest value, that is, 6.3, it is only required to adjust the reflux ratio to 300% to restore the pH value to above 6.8. The integrated bioreactor is running normally and has an excellent treatment result. The effluent quality index is listed in Table 2.

TABLE 2

| Effluent Quality Index | | | |
|---|---|---|---|
| Wastewater quality index | COD (mg/L) | BOD (mg/L) | pH |
| Variation range | 120-200 | 30-40 | 7-8.5 |

Comparative Example 1

A UASB is used to treat the above organic wastewater with hydraulic retention time at 18 h. When the temperature is 10-15° C., removal rate of COD is only 60%; when temperature is 5-10° C., removal rate of COD is only 20-40%; when VFA concentration of effluent reaches to 600-1000 mg/L, acidification appears in the bioreactor. Thus, 3000 mg/L alkalinity must be added to ensure normal operation of the bioreactor.

Example 2

The aforementioned devices and treatment process are used for treatment of highly-concentrated organic wastewater from a brewery. The quality index of the wastewater are listed in Table 3:

TABLE 3

| Highly-concentrated Organic Wastewater Quality Index | | | | |
|---|---|---|---|---|
| Wastewater quality index | COD (mg/L) | BOD (mg/L) | pH | Alkalinity |
| Variation range | 1800-2600 | 900-1600 | 6.0-7.0 | 300-550 |

The hydraulic retention times of the UASB and the MBBR are 14 h and 4 h, respectively. The specific gravity of suspended carriers added in the MBBR is 0.99. The feeding rate is 40% and dissolved oxygen is 2 mg/L. Strictly monitor the effluent pH level of the UASB reactor during the operation and adjust reflux ratio in time. When the pH value reaches the lowest value, that is, 6.3, it is only required to adjust the reflux ratio to 200% to restore the pH value to above 6.8. The integrated bioreactor is running normally and has an excellent treatment result. The effluent quality index is listed in Table 4.

TABLE 4

Effluent Quality Index

| Wastewater quality index | COD (mg/L) | BOD (mg/L) | pH |
|---|---|---|---|
| Variation range | 80-120 | 20-35 | 7.0-8.0 |

Comparative Example 2

A UASB is used to treat the above organic wastewater with hydraulic retention time at 14 h. When the temperature is 10-15° C., removal rate of COD is only 65%; when temperature is 5-10° C., removal rate of COD is only 30-45%; when VFA concentration of effluent reaches to 500-800 mg/L, acidification appears in the bioreactor. Thus, 2000 mg/L alkalinity must be added to ensure normal operation of the bioreactor.

The invention can also be used to treat highly-concentrated organic wastewater under normal temperatures.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An integrated bioreactor having a concentric columnar structure and comprising an inner layer, an outer layer, an on-line pH monitor, a mechanical agitation, an inclined plate, a half-rhombic baffle and an air distributor, wherein
    the inner layer is an upflow anaerobic sludge blanket (UASB) and the outer layer is a moving bed biofilm reactor (MBBR), and effluent of the MBBR is recycled into the UASB, a ratio of width to height of a reaction zone of the MBBR is between 0.25 and 0.5, the MBBR width being the difference between a diameter of the integrated bioreactor and that of the UASB;
    the on-line pH monitor is arranged at a water outlet of the UASB;
    the mechanical agitation device is arranged at the bottom of the UASB;
    the inclined plate and the half-rhombic baffle are respectively arranged at 1-2 m position from the bottom of the bioreactor; and
    the air distributor is either a perforated pipe or an aerator forming a concentric circle and mounted above the inclined plate and the half-rhombic baffle.

2. A method for treatment of organic wastewater comprising applying the integrated bioreactor of claim 1 to organic wastewater.

3. A method of using an integrated bioreactor for treatment of organic wastewater, wherein the integrated bioreactor having a concentric columnar structure and comprising an inner layer and an outer layer, the inner layer is an upflow anaerobic sludge blanket (UASB) and the outer layer is a moving bed biofilm reactor (MBBR), and effluent of the MBBR is recycled into the UASB; the method comprising the steps of:
    a) introducing wastewater into a bottom water distributor of the UASB comprising a mechanical agitation device arranged above the bottom water distributor, agitating the wastewater so that anaerobes degrade macromolecular organic substances into micromolecular organic substances, biogas, carbon dioxide, and water, separating biogas, anaerobic sludge, and water using a three-phase separator to make the biogas enter a gas collection tank, the sludge deposit into the UASB's reaction zone, and the wastewater flow upward to the top of the bioreactor and thereafter flow under gravity to the bottom of the bioreactor and enter the outer layer MBBR;
    b) carrying out second-time sludge-water separation by the inclined plate and the half-rhombic baffle arranged in a reaction zone of the MBBR;
    c) flowing upward the wastewater to an aeration device of the MBBR where the wastewater is furiously mixed with gas and the gas, wastewater, and fluidized carriers are fully contacted; collecting effluent from an effluent weir arranged on the top of the MBBR into a water tank; and
    d) pumping the effluent to an entrance of the bioreactor using a reflux pump arranged between the water tank and the integrated bioreactor.

4. The method of claim 3, wherein the mechanical agitation device is in a shutoff state under normal conditions and operates when UASB's water outlet pH <6.8.

5. The method of claim 4, wherein the specific gravity of the suspended carriers to be added is 0.93-0.99, feeding rate thereof is 40-60%, and aeration rate shall ensure that the dissolved oxygen volume is at 2-4 mg/L.

6. The method of claim 5, wherein the reflux ratio of the MBBR to the UASB is 100-300%; when the pH of the UASB's water outlet is 6.8-7.5, the reflux ratio will be 100% and when the pH<6.8, the reflux ratio is increased.

7. An integrated bioreactor having a concentric columnar structure and comprising an inner layer, an outer layer, an inclined plate, a half-rhombic baffle and an air distributor, wherein
    the inner layer is an upflow anaerobic sludge blanket (UASB) and the outer layer is a moving bed biofilm reactor (MBBR), and effluent of the MBBR is recycled into the UASB;
    the inclined plate and the half-rhombic baffle are respectively arranged at 1-2 m position from the bottom of the bioreactor; and
    the air distributor of the MBBR is either a perforated pipe or an aerator forming a concentric circle and mounted above the inclined plate and the half-rhombic baffle.

8. The bioreactor of claim 7, wherein an on-line pH monitor is arranged at a water outlet of the UASB.

9. The bioreactor of claim 7, wherein a mechanical agitation device is arranged at the bottom of the UASB.

10. The bioreactor of claim 7, wherein a ratio of width to height of a reaction zone of the MBBR is between 0.25 and 0.5, the MBBR width being the difference between a diameter of the integrated bioreactor and that of the UASB.

11. A method for treatment of organic wastewater comprising applying the integrated bioreactor of claim 7 to organic wastewater.

* * * * *